United States Patent
Yamamoto et al.

(10) Patent No.: US 11,289,250 B2
(45) Date of Patent: Mar. 29, 2022

(54) SINTERED FERRITE MAGNET

(71) Applicant: HITACHI METALS, LTD., Tokyo (JP)

(72) Inventors: Masaki Yamamoto, Tokyo (JP); Yoshinori Kobayashi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/611,517

(22) PCT Filed: May 17, 2018

(86) PCT No.: PCT/JP2018/019104
§ 371 (c)(1),
(2) Date: Nov. 7, 2019

(87) PCT Pub. No.: WO2018/216594
PCT Pub. Date: Nov. 29, 2018

(65) Prior Publication Data
US 2020/0211743 A1    Jul. 2, 2020

(30) Foreign Application Priority Data

May 24, 2017  (JP) .............................. JP2017-102245
Mar. 20, 2018 (JP) .............................. JP2018-052106

(51) Int. Cl.
*H01F 1/10*   (2006.01)
*C01G 51/00*  (2006.01)
*C01G 49/00*  (2006.01)

(52) U.S. Cl.
CPC ............... *H01F 1/10* (2013.01); *C01G 51/70* (2013.01); *C01P 2002/52* (2013.01); *C01P 2006/42* (2013.01)

(58) Field of Classification Search
CPC ... H01F 1/344; H01F 1/34; H01F 1/10; H01F 1/0315; C01G 49/06; C01G 49/0063; C01G 51/70; C01P 2002/52; C01P 2006/42; C04B 35/2658
See application file for complete search history.

(56) References Cited

U.S. PATENT DOCUMENTS

| | | | |
|---|---|---|---|
| 6,086,781 | A | 7/2000 | Taguchi et al. |
| 6,139,766 | A | 10/2000 | Taguchi et al. |
| 2007/0194269 | A1 | 8/2007 | Kobayashi et al. |
| 2009/0022992 | A1 | 1/2009 | Takami et al. |
| 2010/0237273 | A1 | 9/2010 | Kobayashi et al. |
| 2011/0024672 | A1 | 2/2011 | Takami et al. |
| 2013/0285779 | A1 | 10/2013 | Kobayashi et al. |
| 2015/0221424 | A1* | 8/2015 | Kobayashi ......... C01G 49/0054 252/62.57 |

FOREIGN PATENT DOCUMENTS

| | | |
|---|---|---|
| CN | 1239578 A | 12/1999 |
| CN | 101316803 A | 12/2008 |
| EP | 1 808 422 A1 | 7/2007 |
| EP | 2 881 956 A1 | 6/2015 |
| JP | 11-154604 A | 6/1999 |
| JP | 2009-246243 A | 10/2009 |
| JP | 2010-001171 A | 1/2010 |
| JP | 2012-84869 A | 4/2012 |
| JP | 5929764 B2 | 6/2016 |
| JP | 2017-69259 A | 4/2017 |
| KR | 10-2015-0038410 A | 4/2015 |

OTHER PUBLICATIONS

Communication dated Jul. 3, 2020, from the Korean Patent Office in application No. 10-2019-7034393.
International Search Report of PCT/JP2018/019104 dated Jul. 31, 2018.
Office Action dated Aug. 21, 2020 in Chinese Application No. 201880033415.5.
The Extended European Search Report dated Feb. 9, 2021, issued by the European Patent Office in application No. 18806853.0.

* cited by examiner

*Primary Examiner* — Matthew E. Hoban
*Assistant Examiner* — Lynne Edmondson
(74) *Attorney, Agent, or Firm* — Sughrue Mion, PLLC (57) ABSTRACT

A sintered ferrite magnet represented by the general formula of $Ca_{1-x}La_xFe_{2n-y-z}Co_yZn_z$ expressing the atomic ratios of metal elements of Ca, La, Fe, Co and Zn, wherein x, y, z, and n [$2n$ is a molar ratio represented by $2n=(Fe+Co+Zn)/(Ca+La)$] meet $0.4<x<0.75$, $0.15\leq y<0.4$, $0.11\leq z<0.4$, $0.26\leq(y+z)<0.65$, and $3\leq n\leq 6$.

19 Claims, 3 Drawing Sheets

SINTERED FERRITE MAGNET

CROSS REFERENCE TO RELATED APPLICATIONS

This application is a National Stage of International Application No. PCT/JP2018/019104 filed May 17, 2018, claiming priority based on Japanese Patent Application No. 2017-102245 filed May 24, 2017 and Japanese Patent Application No. 2018-052106 filed Mar. 20, 2018.

FIELD OF THE INVENTION

The present invention relates to a sintered ferrite magnet.

BACKGROUND OF THE INVENTION

Sintered ferrite magnets are extremely chemically stable with excellent cost performance because their main starting material is inexpensive iron oxide, though their maximum energy products are only 1/10 of those of sintered rare earth magnets (for example, sintered NdFeB magnets). Accordingly, their global production is still largest among magnet materials.

Among various applications such as motors, speakers, etc., in which sintered ferrite magnets are used, motors for automobiles, home electric appliances, etc. strongly demand high-performance materials. Because of recent situations in which rare earth materials have been becoming more expensive and suffering more risks of procurement, investigation has been made to use sintered ferrite magnets in industrial motors, motors for driving electric vehicles (EVs, HVs, PHVs, etc.), power generators, etc., in which only sintered rare earth magnets have been used so far.

Typical sintered ferrite magnets are Sr ferrites having a magnetoplumbite structure, whose basic composition is expressed by $SrFe_{12}O_{19}$. With sintered Sr—La—Co ferrite magnets obtained by substituting part of $Sr^{2+}$ by $La^{3+}$ and part of $Fe^{3+}$ by $Co^{2+}$ in $SrFe_{12}O_{19}$ put into practical use in a latter part of 1990, the magnetic properties of ferrite magnets were drastically improved. In 2007, sintered Ca—La—Co ferrite magnets having further improved magnetic properties were put into practical use. However, to be used in the above applications, sintered Ca—La—Co ferrite magnets need to have higher performance, and improvement in residual magnetic flux densities (hereinafter referred to "$B_r$") is desired to increase the power of motors in particular applications (for example, motors for home electric appliances).

It is known that $B_r$ is improved by substituting part of Co by Zn in sintered Sr—La—Co ferrite magnets (JP 11-154604 A, etc.).

However, the substitution of part of Co by Zn in sintered Sr—La—Co ferrite magnets has not been practically conducted, because it improves $B_r$ little, while drastically decreasing coercivity (hereinafter referred to as "$H_{cJ}$").

OBJECT OF THE INVENTION

Accordingly, an object of the present invention is to provide a sintered ferrite magnet having high $B_r$ with little decrease in $H_{cJ}$.

SUMMARY OF THE INVENTION

The inventors have found that in the general formula of $Ca_{1-x}La_xFe_{2n-y-z}Co_yZn_z$ expressing the atomic ratios of metal elements of Ca, La, Fe, Co and Zn in Japanese Patent Application No. 2017-102245, meeting the following requirements of x, y, z, and n [2n is a molar ratio represented by 2n=(Fe+Co+Zn)/(Ca+La)] provides a sintered ferrite magnet having high $B_r$ with little decrease in $H_{cJ}$:

0.4≤x≤0.6,
0<y≤0.35,
0<z≤0.35,
0.2≤(y+z)≤0.4, and
3≤n≤6.

As a result of further investigation, the inventors have found that a new composition range partially overlapping the composition range of Japanese Patent Application No. 2017-102245 provides magnetic properties equal to or higher than those obtained by the composition range of Japanese Patent Application No. 2017-102245, proposing the present invention. Incidentally, sintered ferrite magnets described below are illustrative examples of the present invention, and the present invention is not restricted to the composition represented by the above general formula.

Thus, the sintered ferrite magnet of the present invention is represented by the general formula of $Ca_{1-x}La_xFe_{2n-y-z}Co_yZn_z$ expressing the atomic ratios of metal elements of Ca, La, Fe, Co and Zn, wherein x, y, z, and n [2n is a molar ratio expressed by 2n=(Fe+Co+Zn)/(Ca+La)] meet 0.4<x<0.75,
0.15≤y<0.4,
0.11≤z<0.4,
0.26≤(y+z)<0.65, and
3≤n≤6.

The above y and z preferably meet 0.15≤y≤0.35, and 0.15≤z≤0.35.

The above x preferably meets 0.475≤x≤0.7.

The above y and z preferably meet 0.26≤(y+z)≤0.6.

The sintered ferrite magnet of the present invention preferably contains 1.8% or less by mass of $SiO_2$.

In the above general formula, part of La may be substituted by at least one of rare earth elements excluding La.

In the above general formula, 50% or less by mol of La may be substituted by at least one of rare earth elements excluding La.

Effects of the Invention

The present invention can provide a sintered ferrite magnet having high $B_r$ with little decrease in $H_{cJ}$.

DESCRIPTION OF THE PREFERRED EMBODIMENTS

In the sintered ferrite magnet of the present invention, the atomic ratio x (La content) is 0.4<x<0.75. Less than 0.4 or 0.75 or more of x fails to provide high $B_r$. The atomic ratio x is more preferably 0.475≤x≤0.7. Part of La may be substituted by at least one of rare earth elements excluding La. The amount of La substituted is preferably 50% or less by mol of the original amount of La.

The atomic ratio y (Co content) is $0.15 \leq y \leq 0.4$. Less than 0.15 of y tends to provide lower $H_{cJ}$, while 0.4 or more of y tends to provide lower $B_r$. The atomic ratio y is more preferably $0.15 \leq y \leq 0.35$.

The atomic ratio z (Zn content) is $0.11 \leq z \leq 0.4$. Less than 0.11 of z tends to provide lower $B_r$, while 0.4 or more of z tends to provide lower $H_{cJ}$. The atomic ratio z is more preferably $0.15 \leq z \leq 0.35$.

The atomic ratios y and z meet the relation of $0.26 \leq (y+z) \leq 0.65$. When (y+z) is less than 0.26 or 0.65 or more, excellent magnetic properties cannot be obtained. (y+z) is more preferably $0.26 \leq (y+z) \leq 0.6$.

In the above general formula, the molar ratio 2n is expressed by $2n=(Fe+Co+Zn)/(Ca+La)$, wherein n is $3 \leq n \leq 6$. Less than 3 or more than 6 of n fails to provide high $B_r$.

In the production process of the sintered ferrite magnet of the present invention, 1.8% or less by mass of $SiO_2$ may be added as a sintering aid, as described later. $SiO_2$ added as a sintering aid becomes a liquid-phase component during sintering, remaining as one component in grain boundaries of the sintered ferrite magnet. Accordingly, when $SiO_2$ is added as a sintering aid, the sintered ferrite magnet of the present invention contains 1.8% or less by mass of $SiO_2$. The $SiO_2$ content is a percentage (% by mass) of the mass of $SiO_2$ per the total mass (100) of $CaCO_3$, $La(OH)_3$, $Fe_2O_3$, $Co_3O_4$, $ZnO$ and $SiO_2$, which is calculated by converting each mass of Ca, La, Fe, Co, Zn and Si in the component analysis of the sintered ferrite magnet, for example, by an ICP optical emission spectrometer to each mass of $CaCO_3$, $La(OH)_3$, $Fe_2O_3$, $Co_3O_4$, $ZnO$ and $SiO_2$.

Though the above general formula is expressed by the atomic ratios of metal elements, the composition including oxygen (O) is expressed by the general formula of $Ca_{1-x}La_xFe_{2n-y-z}Co_yZn_zO_\alpha$. The mol $\alpha$ of oxygen is basically $\alpha=19$, though it varies depending on the valences of Fe and Co, and the values of x, y, z, and n. Also, a ratio of oxygen to metal elements may change depending on the vacancy of oxygen, the change of valence of Fe in a ferrite phase, the change of valence of Co, etc. when sintered in a reducing atmosphere. Accordingly, the actual mol $\alpha$ of oxygen may deviate from 19. Thus, the atomic ratios of metal elements are used in the present invention, as the easiest way of expressing the composition.

A main phase constituting the sintered ferrite magnet of the present invention is a compound phase (ferrite phase) having a hexagonal magnetoplumbite (M-type) structure. In general, a magnetic material, particularly a sintered magnet, is composed of pluralities of compounds, and a compound determining the characteristics (material properties, magnetic properties, etc.) of the magnetic material is defined as "main phase."

"Having a hexagonal magnetoplumbite (M-type) structure" means that when the X-ray diffraction of a sintered ferrite magnet is measured under usual conditions, a hexagonal magnetoplumbite (M-type) structure is observed as a main structure in an X-ray diffraction pattern.

The sintered ferrite magnet of the present invention can be produced by methods used for known sintered Sr—La—Co ferrite magnets and Ca—La—Co ferrite magnets. An example of the production methods will be explained below.

Compounds such as oxides, carbonates, hydroxides, nitrates, chlorides, etc. of metals for starting material powders can be used regardless of their valences. Solutions containing starting material powders may also be used.

Compounds of Ca include carbonates, oxides, chlorides, etc. of Ca. Compounds of La include oxides such as $La_2O_3$, etc., hydroxides such as $La(OH)_3$, etc., carbonates such as $La_2(CO_3)_3 \cdot 8H_2O$, etc. Compounds of Fe include iron oxide, iron hydroxide, iron chloride, mill scale, etc. Compounds of Co include oxides such as $CoO$, $Co_3O_4$, etc., hydroxides such as $CoOOH$, $Co(OH)_2$, etc., carbonates such as $CoCO_3$, etc., and basic carbonates such as $m_2CoCO_3 \cdot m_3Co(OH)_2 \cdot m_4H_2O$ ($m_2$, $m_3$ and $m_4$ are positive numbers), etc. Compounds of Zn include ZnO.

To accelerate reactions during calcining, up to about 1% by mass of compounds containing B (boron) such as $B_2O_3$, $H_3BO_3$, etc. may be added, if necessary. Particularly the addition of $H_3BO_3$ is effective to improve the magnetic properties. The amount of $H_3BO_3$ added is more preferably 0.3% or less by mass, most preferably about 0.1% by mass. Because $H_3BO_3$ has an effect of controlling the shapes and sizes of crystal grains in sintering, it may be added after calcining (before fine pulverization or sintering), or both before calcining and after calcining.

The prepared starting material powders are formulated and mixed to provide a starting material powder mixture. The formulating and mixing of the starting material powders may be conducted in a wet or dry state. Stirring with media such as steel balls, etc. makes the mixing of starting material powders more uniform. In the case of wet mixing, water is preferably used as a dispersion medium. To improve the dispersion of starting material powders, known dispersants such as ammonium polycarboxylate, calcium gluconate, etc. may be used. A slurry of the mixed starting materials may be calcined without further treatment or after dewatering.

The starting material powder mixture obtained by dry or wet mixing is heated in an electric furnace, a gas furnace, etc., to form a ferrite compound having a hexagonal magnetoplumbite (M-type) structure by a solid phase reaction. This process is called "calcining," and the resultant compound is called "calcined body."

The calcining step is preferably conducted in an atmosphere having an oxygen concentration of 5% or more by volume. Less than 5% by volume of the oxygen concentration causes abnormal grain growth, the formation of undesirable phases, etc. The oxygen concentration is more preferably 20% or more by volume.

As the temperature is elevated in the calcining step, a solid phase reaction forming a ferrite phase proceeds. When the calcining temperature is lower than 1100° C., unreacted hematite (iron oxide) remains, resulting in low magnetic properties. On the other hand, when the calcining temperature exceeds 1450° C., crystal grains grow excessively, needing too long time in a pulverization step. Accordingly, the calcining temperature is preferably 1100-1450° C. The calcining time is preferably 0.5-5 hours. The calcined body is preferably coarsely pulverized by a hammer mill, etc.

The calcined body is then pulverized (finely pulverized) by a vibration mill, a jet mill, a ball mill, an attritor, etc. to form powder (finely pulverized powder). The average particle size of the powder is preferably about 0.4-0.8 μm. The average particle size of powder is herein measured by an air permeability method using an apparatus for measuring a specific surface area of powder (for example, SS-100 available from Shimadzu Corporation), etc. The pulverization step may be either one or both of dry pulverization and wet pulverization. The wet pulverization is conducted using water and/or nonaqueous solvents (organic solvents such as acetone, ethanol, xylene, etc.) as a dispersion medium. Typically, a slurry containing water (dispersion medium) and the calcined body is formed. The slurry may contain 0.2-2% by mass of a known dispersant and/or surfactant on a solid basis. After the wet pulverization, the slurry may be concentrated.

In a molding step after the pulverization step, the slurry is pressed in or without a magnetic field while removing the dispersion medium. Pressing in a magnetic field can align the crystallization orientations of powder particles, drastically improving magnetic properties. To further improve the orientation, a dispersant and a lubricant each 0.1-1% by mass may be added to the slurry before molding. Also, before molding, the slurry may be concentrated if necessary. The concentration is preferably conducted by centrifugal separation, filter pressing, etc.

After the calcining step and before the molding step, a sintering aid is added to the calcined body or powder (coarsely or finely pulverized powder). The sintering aid is preferably $SiO_2$ and $CaCO_3$. The sintered ferrite magnet of the present invention belongs to a sintered Ca—La—Co ferrite magnet, as is clear from its composition. Because the sintered Ca—La—Co ferrite magnet contains Ca as a main phase component, it can be sintered, with a liquid phase formed without adding a sintering aid such as $SiO_2$ and $CaCO_3$, etc., unlike conventional sintered Sr—La—Co ferrite magnets, etc. Namely, the sintered ferrite magnet of the present invention can be produced without adding $SiO_2$ or $CaCO_3$ for mainly forming a grain boundary phase in a sintered ferrite magnet. However, to suppress decrease in H-j, $SiO_2$ and $CaCO_3$ in amounts described below may be added.

The amount of $SiO_2$ added is preferably 1.8% or less by mass per 100% by mass of the calcined body or powder. The amount of $CaCO_3$ added is preferably 2% or less by mass, calculated as CaO, per 100% by mass of the calcined body or powder. The sintering aid may be added at any time before, during or after the pulverization step. For example, (a) after the sintering aid is added to the calcined body, the pulverization step is conducted, (b) the sintering aid is added during the pulverization step, or (c) after the sintering aid is added to the pulverized powder (finely pulverized powder) and mixed, the molding step is conducted. As the sintering aid, $Cr_2O_3$, $Al_2O_3$, etc. may also be added, in addition to $SiO_2$ and $CaCO_3$. The amount of each of them may be 1% or less by mass.

The amount of $CaCO_3$ added is herein expressed by the value calculated as CaO. The amount of $CaCO_3$ added can be determined from the amount calculated as CaO by the formula of (molecular weight of $CaCO_3$×amount calculated as CaO)/molecular weight of CaO. For example, when 0.5% by mass of $CaCO_3$ calculated as CaO is added, [100.09 (molecular weight of $CaCO_3$)×0.5% by mass (amount calculated as CaO)]/56.08 (molecular weight of CaO)=0.892% by mass (amount of $CaCO_3$ added). Incidentally, the molecular weight of $CaCO_3$=40.08 (atomic weight of Ca)+ 12.01 (atomic weight of C)+48.00 (atomic weight of O×3)= 100.09, and the molecular weight of CaO=40.08 (atomic weight of Ca)+16.00 (atomic weight of O)=56.08.

The green body obtained by pressing is sintered, after degreasing if necessary. The sintering is conducted in an electric furnace, a gas furnace, etc. The sintering is conducted in an atmosphere having an oxygen concentration of preferably 10% or more by volume, more preferably 20% or more by volume, most preferably 100% by volume. The sintering temperature is preferably 1150° C. to 1250° C. The sintering time is preferably 0 hour (no keeping time at the sintering temperature) to 2 hours.

After the sintering step, a final sintered ferrite magnet is obtained through known production steps such as a working step, a washing step, an inspection step, etc.

EXAMPLE

The present invention will be explained in further detail referring to Examples, without intention of restricting the present invention thereto.

Reference Example 1

As Reference Examples according to the embodiments described in Japanese Patent Application No. 2017-102245 (hereinafter referred to simply as "Reference Examples"), $CaCO_3$ powder, $La(OH)_3$ powder, $Fe_2O_3$ powder, $Co_3O_4$ powder and ZnO powder were formulated and mixed, such that in the general formula of $Ca_{1-x}La_xFe_{2n-y-z}Co_yZn_z$, the atomic ratios 1-x, x, y and z, and n were as shown in Samples 1-8 in Table 1, obtaining three types of starting material powder mixtures (Samples 1, 2-7, and 8). 0.1% by mass of $H_3BO_3$ powder was added to and mixed with 100% by mass of each starting material powder mixture.

As Comparative Examples to Samples 1-8 (Reference Examples), $SrCO_3$ powder, $La(OH)_3$ powder, $Fe_2O_3$ powder, $Co_3O_4$ powder and ZnO powder were formulated and mixed, such that in the general formula of $Sr_{1-x}La_xFe_{2n-y-z}Co_yZn_z$, the atomic ratios of Sr, La, Co and Zn and n were as shown in Samples 9-16 in Table 1, to obtain each starting material powder mixture. 0.1% by mass of $H_3BO_3$ powder was added to and mixed with 100% by mass of each starting material powder mixture.

Each of four types of the resultant starting material powder mixtures was mixed for 4 hours in a wet ball mill, dried, and granulated. It was then calcined at the calcining temperature shown in Table 1 for 3 hours in the air, to obtain 6 types of calcined bodies.

Each of the above calcined bodies was coarsely pulverized by a hammer mill, to obtain 6 types of coarsely pulverized calcined powders. $SiO_2$ and $CaCO_3$ (amount calculated as CaO) shown in Table 1 were added to 100% by mass of each coarsely pulverized calcined powder, and finely pulverized in a wet ball mill containing water as a dispersion medium to an average particle size of 0.6 µm [measured by an air permeability method using an apparatus for measuring a specific surface area of powder (SS-100 available from Shimadzu Corporation)], to obtain 16 types of finely pulverized slurry.

Using a parallel-magnetic-field molding machine (vertical-magnetic-field molding machine), in which the direction of a magnetic field was in parallel with the compression direction, each finely pulverized slurry obtained by the pulverization step was molded under pressure of about 50 MPa in a magnetic field of about 1 T while removing the dispersion medium, to obtain 16 types of green bodies.

Each of the above green bodies was sintered at 1170° C. for 1 hour in the air, to obtain 16 types of sintered ferrite magnets. The measured $J_s$, $B_r$, (BH)max and $H_{cJ}$ of the resultant sintered ferrite magnets are shown in Table 1. In Table 1, Samples 1-8 with * are Reference Examples according to the embodiments of Japanese Patent Application No. 2017-102245, and Samples 9-16 with ** are Comparative Examples of conventional sintered Sr—La—Co magnets, in which part of Co was substituted by Zn.

Figure 1:
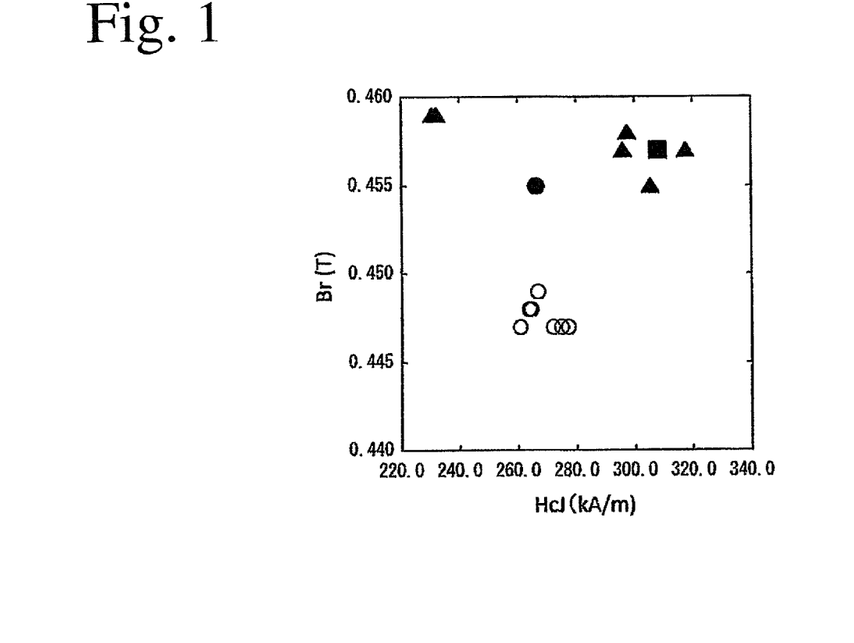
FIG. 1 is a graph showing the relation between $H_{cJ}$ and $B_r$ in the sintered ferrite magnet of Reference Example 1.

FIG. 1 is a graph showing the relation between $H_{cJ}$ and $B_r$ in Table 1. In FIG. 1, the abscissa indicates $H_{cJ}$ (kA/m), and the ordinate indicates $B_r$ (T). Black plots are Reference Examples, among which a round plot is Sample 1, triangular plots are Samples 2-7, and a square plot is Sample 8. White round plots are Samples 9-16 of Comparative Examples.

The atomic ratios in Table 1 indicate the atomic ratios (compositions) of formulated starting material powders. The atomic ratios of components in the sintered ferrite magnets (compositions of sintered magnets) can be determined by calculation from those of components formulated, the amounts of additives ($H_3BO_3$, etc.) added before the calcining step, and the amounts of sintering aids added after the calcining step and before the molding step, and the calculated values are basically equal to those obtained by analyzing the sintered ferrite magnets by an ICP optical emission spectrometer (for example, ICPV-1017 available from Shimadzu Corporation, etc.).

TABLE 1

| | Atomic Ratio ($Ca_{1-x}La_xFe_{2n-y-z}Co_yZn_z$ or $Sr_{1-x}La_xFe_{2n-y-z}Co_yZn_z$) | | | | | |
|---|---|---|---|---|---|---|
| Sample | Ca 1 − x | Sr 1 − x | La x | Co y | Zn z | Co + Zn y + z | n |
| 1* | 0.55 | — | 0.45 | 0.21 | 0.07 | 0.28 | 5.29 |
| 2* | 0.55 | — | 0.45 | 0.21 | 0.07 | 0.28 | 5.19 |
| 3* | 0.55 | — | 0.45 | 0.21 | 0.07 | 0.28 | 5.19 |
| 4* | 0.55 | — | 0.45 | 0.21 | 0.07 | 0.28 | 5.19 |
| 5* | 0.55 | — | 0.45 | 0.21 | 0.07 | 0.28 | 5.19 |
| 6* | 0.55 | — | 0.45 | 0.21 | 0.07 | 0.28 | 5.19 |
| 7* | 0.55 | — | 0.45 | 0.21 | 0.07 | 0.28 | 5.19 |
| 8* | 0.55 | — | 0.45 | 0.21 | 0.07 | 0.28 | 5.09 |
| 9** | — | 0.70 | 0.30 | 0.21 | 0.07 | 0.28 | 5.94 |
| 10** | — | 0.70 | 0.30 | 0.21 | 0.07 | 0.28 | 5.94 |
| 11** | — | 0.70 | 0.30 | 0.21 | 0.07 | 0.28 | 5.94 |
| 12** | — | 0.70 | 0.30 | 0.21 | 0.07 | 0.28 | 5.94 |
| 13** | — | 0.70 | 0.30 | 0.21 | 0.07 | 0.28 | 5.94 |
| 14** | — | 0.70 | 0.30 | 0.21 | 0.07 | 0.28 | 5.94 |
| 15** | — | 0.70 | 0.30 | 0.21 | 0.07 | 0.28 | 5.94 |
| 16** | — | 0.70 | 0.30 | 0.21 | 0.07 | 0.28 | 5.94 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 1* | 1300 | 0.450 | 0.50 | 0.464 | 0.455 | 39.8 | 266.2 |
| 2* | 1200 | 0.450 | 0.50 | 0.464 | 0.459 | 41.0 | 232.2 |
| 3* | 1200 | 0.475 | 0.50 | 0.463 | 0.458 | 40.9 | 297.5 |
| 4* | 1200 | 0.500 | 0.50 | 0.464 | 0.457 | 40.4 | 317.6 |
| 5* | 1300 | 0.450 | 0.50 | 0.466 | 0.459 | 40.9 | 230.7 |
| 6* | 1300 | 0.475 | 0.50 | 0.468 | 0.457 | 40.4 | 296.0 |
| 7* | 1300 | 0.500 | 0.50 | 0.464 | 0.455 | 40.1 | 305.4 |
| 8* | 1200 | 0.525 | 0.50 | 0.463 | 0.457 | 40.7 | 308.1 |
| 9** | 1200 | 0.450 | 0.50 | 0.454 | 0.447 | 38.4 | 277.2 |
| 10** | 1200 | 0.475 | 0.50 | 0.458 | 0.448 | 38.3 | 264.5 |
| 11** | 1200 | 0.500 | 0.50 | 0.452 | 0.447 | 38.4 | 274.9 |
| 12** | 1200 | 0.525 | 0.50 | 0.457 | 0.447 | 38.1 | 272.0 |
| 13** | 1300 | 0.450 | 0.50 | 0.454 | 0.449 | 38.7 | 266.8 |
| 14** | 1300 | 0.475 | 0.50 | 0.453 | 0.448 | 38.4 | 263.9 |
| 15** | 1300 | 0.500 | 0.50 | 0.453 | 0.447 | 38.1 | 260.8 |
| 16** | 1300 | 0.525 | 0.50 | 0.454 | 0.448 | 38.3 | 264.1 |

*Samples of Reference Examples.
**Samples of Comparative Examples.

As shown in Table 1 and FIG. 1, the sintered ferrite magnets of Samples 1-8 (Reference Examples) had high $B_r$ with little decrease in $H_{cJ}$. Also, the sintered ferrite magnets of Samples 1-8 (Reference Examples) had higher $B_r$ and not lower $H_{cJ}$ than those of Samples 9-16 (Comparative Examples) of conventional sintered Sr—La—Co magnets, in which part of Co was substituted by Zn.

Reference Example 2

Figure 2:
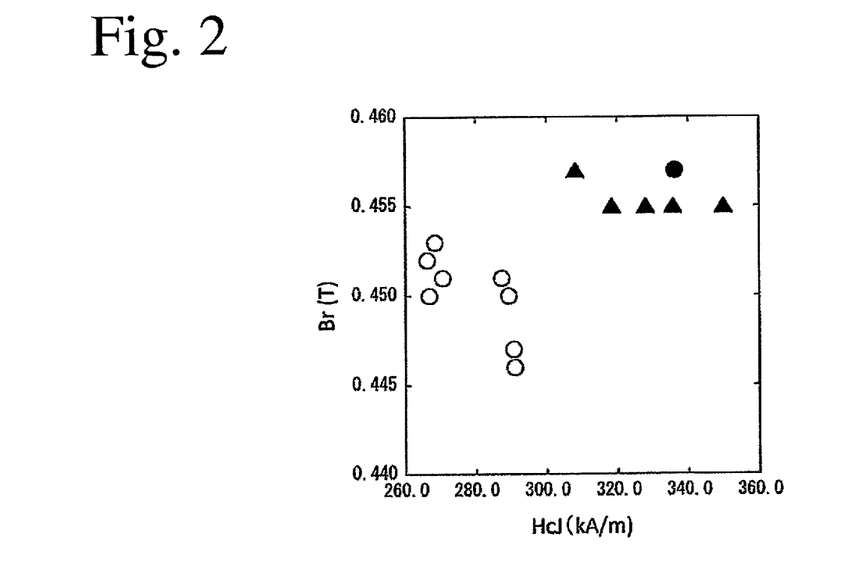
FIG. 2 is a graph showing the relation between $H_{cJ}$ and $B_r$ in the sintered ferrite magnet of Reference Example 2.

Samples 17-22 of Reference Examples (with * in Table 2) according to the embodiments of Japanese Patent Application No. 2017-102245 were produced in the same manner as in Reference Example 1, except for changing the atomic ratios, the value of n, the calcining temperature, and the amounts of $SiO_2$ and $CaCO_3$ (calculated as CaO) to those shown in Table 2 in each Sample. Samples 23-30 (with ** in Table 2) of conventional sintered Sr—La—Co magnets, in which part of Co was substituted by Zn, were also produced as Comparative Examples. The measured $J_s$, $B_r$, (BH)max and $H_{cJ}$ of the resultant sintered ferrite magnets are shown in Table 2. FIG. 2 is a graph showing the relation between $H_{cJ}$ and $B_r$ in Table 2, like in Reference Example 1. A black round plot is Sample 17, black triangular plots are Samples 18-22, and white round plots are Samples 23-30.

TABLE 2

| | Atomic Ratio ($Ca_{1-x}La_xFe_{2n-y-z}Co_yZn_z$ or $Sr_{1-x}La_xFe_{2n-y-z}Co_yZn_z$) | | | | | |
|---|---|---|---|---|---|---|
| Sample | Ca 1 − x | Sr 1 − x | La x | Co y | Zn z | Co + Zn y + z | n |
| 17* | 0.52 | — | 0.48 | 0.23 | 0.05 | 0.28 | 5.29 |
| 18* | 0.52 | — | 0.48 | 0.23 | 0.05 | 0.28 | 5.19 |
| 19* | 0.52 | — | 0.48 | 0.23 | 0.05 | 0.28 | 5.19 |
| 20* | 0.52 | — | 0.48 | 0.23 | 0.05 | 0.28 | 5.19 |
| 21* | 0.52 | — | 0.48 | 0.23 | 0.05 | 0.28 | 5.19 |
| 22* | 0.52 | — | 0.48 | 0.23 | 0.05 | 0.28 | 5.19 |
| 23** | — | 0.70 | 0.30 | 0.23 | 0.05 | 0.28 | 5.94 |
| 24** | — | 0.70 | 0.30 | 0.23 | 0.05 | 0.28 | 5.94 |
| 25** | — | 0.70 | 0.30 | 0.23 | 0.05 | 0.28 | 5.94 |
| 26** | — | 0.70 | 0.30 | 0.23 | 0.05 | 0.28 | 5.94 |
| 27** | — | 0.70 | 0.30 | 0.23 | 0.05 | 0.28 | 5.94 |
| 28** | — | 0.70 | 0.30 | 0.23 | 0.05 | 0.28 | 5.94 |
| 29** | — | 0.70 | 0.30 | 0.23 | 0.05 | 0.28 | 5.94 |
| 30** | — | 0.70 | 0.30 | 0.23 | 0.05 | 0.28 | 5.94 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 17* | 1300 | 0.450 | 0.50 | 0.463 | 0.457 | 40.4 | 336.2 |
| 18* | 1200 | 0.450 | 0.50 | 0.458 | 0.455 | 40.6 | 318.4 |
| 19* | 1200 | 0.475 | 0.50 | 0.460 | 0.455 | 40.4 | 327.9 |
| 20* | 1300 | 0.450 | 0.50 | 0.462 | 0.457 | 40.7 | 308.1 |
| 21* | 1300 | 0.475 | 0.50 | 0.460 | 0.455 | 40.2 | 335.7 |
| 22* | 1300 | 0.500 | 0.50 | 0.460 | 0.455 | 40.5 | 349.9 |
| 23** | 1200 | 0.450 | 0.50 | 0.451 | 0.442 | 37.4 | 287.3 |
| 24** | 1200 | 0.475 | 0.50 | 0.450 | 0.441 | 37.2 | 289.3 |
| 25** | 1200 | 0.500 | 0.50 | 0.447 | 0.441 | 37.1 | 290.7 |
| 26** | 1200 | 0.525 | 0.50 | 0.446 | 0.439 | 36.7 | 291.0 |
| 27** | 1300 | 0.450 | 0.50 | 0.452 | 0.446 | 38.0 | 266.2 |
| 28** | 1300 | 0.475 | 0.50 | 0.450 | 0.445 | 37.8 | 266.8 |
| 29** | 1300 | 0.500 | 0.50 | 0.451 | 0.446 | 37.9 | 270.6 |
| 30** | 1300 | 0.525 | 0.50 | 0.453 | 0.446 | 38.0 | 268.4 |

*Samples of Reference Examples.
**Samples of Comparative Examples.

As shown in Table 2 and FIG. 2, the sintered ferrite magnets of Samples 17-22 (Reference Examples) had high $B_r$ with little decrease in $H_{cJ}$. Also, the sintered ferrite magnets of Samples 17-22 (Reference Examples) had higher $B_r$ and not lower $H_{cJ}$ than those of Samples 23-30 (Comparative Examples) of conventional sintered Sr—La—Co magnets, in which part of Co was substituted by Zn.

Reference Example 3

Figure 3:
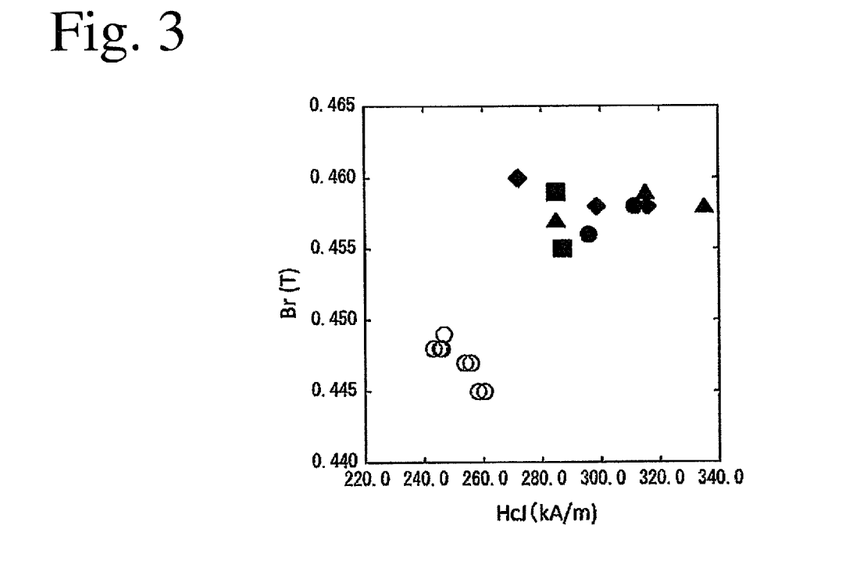
FIG. 3 is a graph showing the relation between $H_{cJ}$ and $B_r$ in the sintered ferrite magnet of Reference Example 3.

Samples 31-40 (with * in Table 3) of Reference Examples according to the embodiments of Japanese Patent Application No. 2017-102245 were produced in the same manner as in Reference Example 1, except for changing the atomic ratios, the value of n, the calcining temperature, and the amounts of $SiO_2$ and $CaCO_3$ (calculated as CaO) to those shown in Table 3 in each Sample. Samples 41-48 (with  in Table 3) of conventional sintered Sr—La—Co magnets, in which part of Co was substituted by Zn, were also produced as Comparative Examples. The measured $J_s$, $B_r$, (BH)max and $H_{cJ}$ of the resultant sintered ferrite magnets are shown in Table 3. FIG. 3** is a graph showing the relation between $H_{cJ}$ and $B_r$ in Table 3, like in Reference Example 1. Black round plots are Samples 31 and 32, black triangular plots are Samples 33-35, black square plots are Sample 36 and 37, black diamond plots are Samples 38-40, and white round plots are Samples 41-48.

TABLE 3

Atomic Ratio ($Ca_{1-x}La_xFe_{2n-y-z}Co_yZn_z$ or $Sr_{1-x}La_xFe_{2n-y-z}Co_yZn_z$)

| Sample | Ca 1 − x | Sr 1 − x | La x | Co y | Zn z | Co + Zn y + z | n |
|---|---|---|---|---|---|---|---|
| 31* | 0.52 | — | 0.48 | 0.23 | 0.10 | 0.33 | 5.32 |
| 32* | 0.52 | — | 0.48 | 0.23 | 0.10 | 0.33 | 5.32 |
| 33* | 0.52 | — | 0.48 | 0.23 | 0.10 | 0.33 | 5.22 |
| 34* | 0.52 | — | 0.48 | 0.23 | 0.10 | 0.33 | 5.22 |
| 35* | 0.52 | — | 0.48 | 0.23 | 0.10 | 0.33 | 5.22 |
| 36* | 0.52 | — | 0.48 | 0.23 | 0.10 | 0.33 | 5.32 |
| 37* | 0.52 | — | 0.48 | 0.23 | 0.10 | 0.33 | 5.32 |
| 38* | 0.52 | — | 0.48 | 0.23 | 0.10 | 0.33 | 5.22 |
| 39* | 0.52 | — | 0.48 | 0.23 | 0.10 | 0.33 | 5.22 |
| 40* | 0.52 | — | 0.48 | 0.23 | 0.10 | 0.33 | 5.22 |
| 41** | — | 0.70 | 0.30 | 0.23 | 0.10 | 0.33 | 5.97 |
| 42** | — | 0.70 | 0.30 | 0.23 | 0.10 | 0.33 | 5.97 |
| 43** | — | 0.70 | 0.30 | 0.23 | 0.10 | 0.33 | 5.97 |
| 44** | — | 0.70 | 0.30 | 0.23 | 0.10 | 0.33 | 5.97 |
| 45** | — | 0.70 | 0.30 | 0.23 | 0.10 | 0.33 | 5.97 |
| 46** | — | 0.70 | 0.30 | 0.23 | 0.10 | 0.33 | 5.97 |
| 47** | — | 0.70 | 0.30 | 0.23 | 0.10 | 0.33 | 5.97 |
| 48** | — | 0.70 | 0.30 | 0.23 | 0.10 | 0.33 | 5.97 |

| Sample | Calcining Temperature [° C.] | SiO₂ [% by mass] | CaCO₃ [% by mass] | $J_s$ [T] | $B_r$ [T] | $(BH)_{max}$ [kJ/m³] | $H_{cJ}$ [kA/m] |
|---|---|---|---|---|---|---|---|
| 31* | 1200 | 0.450 | 0.50 | 0.465 | 0.458 | 40.4 | 311.5 |
| 32* | 1200 | 0.475 | 0.50 | 0.462 | 0.456 | 39.7 | 295.9 |
| 33* | 1200 | 0.475 | 0.50 | 0.464 | 0.457 | 40.4 | 284.9 |
| 34* | 1200 | 0.500 | 0.50 | 0.470 | 0.459 | 40.7 | 315.2 |
| 35* | 1200 | 0.525 | 0.50 | 0.466 | 0.458 | 40.5 | 335.3 |
| 36* | 1300 | 0.450 | 0.50 | 0.466 | 0.459 | 40.5 | 284.9 |
| 37* | 1300 | 0.475 | 0.50 | 0.462 | 0.455 | 39.9 | 287.0 |
| 38* | 1300 | 0.475 | 0.50 | 0.466 | 0.460 | 40.7 | 272.0 |
| 39* | 1300 | 0.500 | 0.50 | 0.463 | 0.458 | 40.5 | 298.7 |
| 40* | 1300 | 0.525 | 0.50 | 0.465 | 0.458 | 40.4 | 315.9 |
| 41** | 1200 | 0.450 | 0.50 | 0.458 | 0.447 | 37.3 | 255.7 |
| 42** | 1200 | 0.475 | 0.50 | 0.461 | 0.447 | 37.1 | 253.7 |
| 43** | 1200 | 0.500 | 0.50 | 0.455 | 0.445 | 36.7 | 258.2 |
| 44** | 1200 | 0.525 | 0.50 | 0.455 | 0.445 | 36.7 | 260.4 |
| 45** | 1300 | 0.450 | 0.50 | 0.458 | 0.448 | 37.0 | 245.4 |
| 46** | 1300 | 0.475 | 0.50 | 0.459 | 0.448 | 36.9 | 243.2 |
| 47** | 1300 | 0.500 | 0.50 | 0.458 | 0.449 | 37.0 | 246.7 |
| 48** | 1300 | 0.525 | 0.50 | 0.457 | 0.448 | 36.8 | 246.0 |

*Samples of Reference Examples.
**Samples of Comparative Examples.

As shown in Table 3 and FIG. 3, the sintered ferrite magnets of Samples 31-40 (Reference Examples) had high $B_r$ with little decrease in $H_{cJ}$. Also, the sintered ferrite magnets of Samples 31-40 (Reference Examples) had higher $B_r$ and not lower $H_{cJ}$ than those of conventional sintered Sr—La—Co magnets of Samples 41-48 (Comparative Examples), in which part of Co was substituted by Zn.

Reference Example 4

Figure 4:
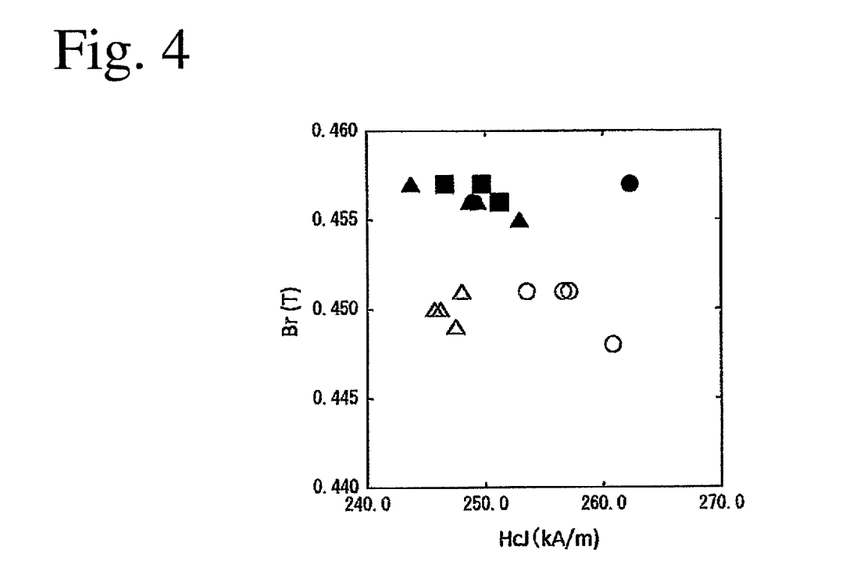
FIG. 4 is a graph showing the relation between $H_{cJ}$ and $B_r$ in the sintered ferrite magnet of Reference Example 4.

Samples 49-57 (with * in Table 4) of Reference Examples according to the embodiments of Japanese Patent Application No. 2017-102245 were produced in the same manner as in Reference Example 1, except for changing the atomic ratios, the value of n, the calcining temperature, and the amounts of $SiO_2$ and $CaCO_3$ (calculated as CaO) to those shown in Table 4 in each Sample. Samples 58-65 (with  in Table 4) of conventional sintered Sr—La—Co magnets, in which part of Co was substituted by Zn, were also produced as Comparative Examples. The measured $J_s$, $B_r$, (BH)max and $H_{cJ}$ of the resultant sintered ferrite magnets are shown in Table 4. FIG. 4** is a graph showing the relation between $H_{cJ}$ and $B_r$ in Table 4, like in Reference Example 1. Black round plots are Samples 49 and 50, black triangular plots are Samples 51-54, black square plots are Samples 55-57, white round plots are Samples 58-61, and white triangular plots are Samples 62-65.

TABLE 4

Atomic Ratio ($Ca_{1-x}La_xFe_{2n-y-z}Co_yZn_z$ or $Sr_{1-x}La_xFe_{2n-y-z}Co_yZn_z$)

| Sample | Ca 1 − x | Sr 1 − x | La x | Co y | Zn z | Co + Zn y + z | n |
|---|---|---|---|---|---|---|---|
| 49* | 0.40 | — | 0.60 | 0.27 | 0.08 | 0.35 | 5.30 |
| 50* | 0.40 | — | 0.60 | 0.27 | 0.08 | 0.35 | 5.30 |
| 51* | 0.40 | — | 0.60 | 0.27 | 0.08 | 0.35 | 5.20 |
| 52* | 0.40 | — | 0.60 | 0.27 | 0.08 | 0.35 | 5.20 |
| 53* | 0.40 | — | 0.60 | 0.27 | 0.08 | 0.35 | 5.20 |
| 54* | 0.40 | — | 0.60 | 0.27 | 0.08 | 0.35 | 5.20 |
| 55* | 0.40 | — | 0.60 | 0.27 | 0.08 | 0.35 | 5.10 |
| 56* | 0.40 | — | 0.60 | 0.27 | 0.08 | 0.35 | 5.10 |
| 57* | 0.40 | — | 0.60 | 0.27 | 0.08 | 0.35 | 5.10 |
| 58** | — | 0.60 | 0.40 | 0.27 | 0.08 | 0.35 | 5.95 |
| 59** | — | 0.60 | 0.40 | 0.27 | 0.08 | 0.35 | 5.95 |
| 60** | — | 0.60 | 0.40 | 0.27 | 0.08 | 0.35 | 5.95 |
| 61** | — | 0.60 | 0.40 | 0.27 | 0.08 | 0.35 | 5.95 |
| 62** | — | 0.55 | 0.45 | 0.32 | 0.08 | 0.40 | 5.98 |
| 63** | — | 0.55 | 0.45 | 0.32 | 0.08 | 0.40 | 5.98 |
| 64** | — | 0.55 | 0.45 | 0.32 | 0.08 | 0.40 | 5.98 |
| 65** | — | 0.55 | 0.45 | 0.32 | 0.08 | 0.40 | 5.98 |

| Sample | Calcining Temperature [° C.] | SiO₂ [% by mass] | CaCO₃ [% by mass] | $J_s$ [T] | $B_r$ [T] | $(BH)_{max}$ [kJ/m³] | $H_{cJ}$ [kA/m] |
|---|---|---|---|---|---|---|---|
| 49* | 1300 | 0.450 | 0.50 | 0.462 | 0.456 | 40.5 | 249.0 |
| 50* | 1300 | 0.475 | 0.50 | 0.461 | 0.457 | 40.9 | 262.3 |
| 51* | 1300 | 0.450 | 0.50 | 0.461 | 0.456 | 40.4 | 249.3 |
| 52* | 1300 | 0.475 | 0.50 | 0.461 | 0.456 | 40.5 | 248.7 |
| 53* | 1300 | 0.500 | 0.50 | 0.462 | 0.457 | 40.7 | 243.7 |
| 54* | 1300 | 0.525 | 0.50 | 0.460 | 0.455 | 40.5 | 252.9 |
| 55* | 1300 | 0.475 | 0.50 | 0.459 | 0.456 | 40.7 | 251.2 |
| 56* | 1300 | 0.500 | 0.50 | 0.461 | 0.457 | 40.7 | 249.7 |
| 57* | 1300 | 0.525 | 0.50 | 0.462 | 0.457 | 40.8 | 246.6 |
| 58** | 1200 | 0.450 | 0.50 | 0.458 | 0.451 | 38.7 | 256.6 |
| 59** | 1200 | 0.475 | 0.50 | 0.458 | 0.451 | 38.5 | 253.5 |
| 60** | 1200 | 0.500 | 0.50 | 0.457 | 0.451 | 38.6 | 257.1 |
| 61** | 1200 | 0.525 | 0.50 | 0.453 | 0.448 | 38.2 | 260.8 |
| 62** | 1300 | 0.450 | 0.50 | 0.459 | 0.451 | 37.5 | 248.0 |
| 63** | 1300 | 0.475 | 0.50 | 0.459 | 0.450 | 37.2 | 246.2 |
| 64** | 1300 | 0.500 | 0.50 | 0.458 | 0.450 | 37.3 | 245.7 |
| 65** | 1300 | 0.525 | 0.50 | 0.459 | 0.449 | 37.3 | 247.5 |

*Samples of Reference Examples.
**Samples of Comparative Examples.

As shown in Table 4 and FIG. 4, the sintered ferrite magnets of Samples 49-57 (Reference Examples) had high $B_r$ with little decrease in $H_{cJ}$. Also, the sintered ferrite magnets of Samples 49-57 (Reference Examples) had higher $B_r$ and not lower $H_{cJ}$ than those of conventional sintered Sr—La—Co magnets of Samples 58-65 (Comparative Examples), in which part of Co was substituted by Zn.

Reference Example 5

Figure 5:
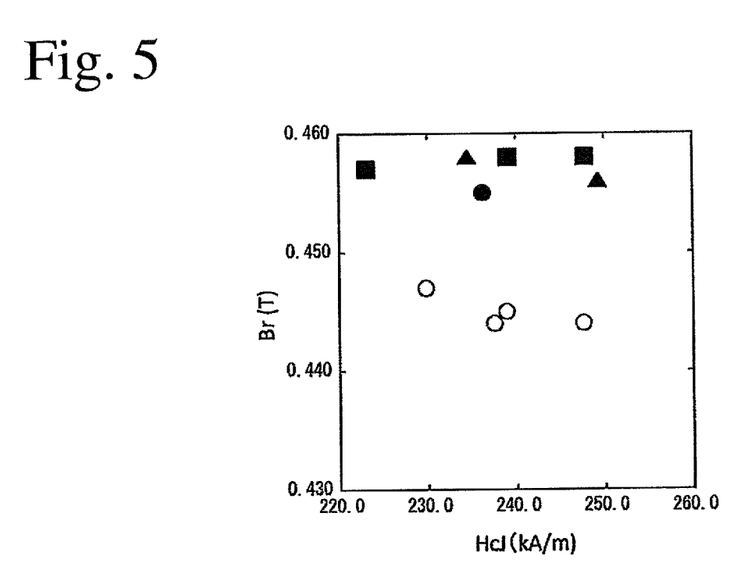
FIG. 5 is a graph showing the relation between $H_{cJ}$ and $B_r$ in the sintered ferrite magnet of Reference Example 5.

Samples 66-71 (with * in Table 5) of Reference Examples according to the embodiments of Japanese Patent Application No. 2017-102245 were produced in the same manner as in Reference Example 1, except for changing the atomic ratios, the value of n, the calcining temperature, and the amounts of $SiO_2$ and $CaCO_3$ (calculated as CaO) to those shown in Table 5 in each Sample. Samples 72-75 (with ** in Table 5) of conventional sintered Sr—La—Co magnets, in which part of Co was substituted by Zn, were also produced as Comparative Examples. The measured $J_s$, $B_r$, (BH)max and $H_{cJ}$ of the resultant sintered ferrite magnets are shown in Table 5. FIG. 5 is a graph showing the relation between $H_{cJ}$ and $B_r$ in Table 5, like in Reference Example 1. A black round plot is Sample 66, black triangular plots are Samples 67 and 68, black square plots are Samples 69-71, and white round plots are Samples 72-75.

TABLE 5

| | Atomic Ratio ($Ca_{1-x}La_xFe_{2n-y-z}Co_yZn_z$ or $Sr_{1-x}La_xFe_{2n-y-z}Co_yZn_z$) | | | | | | |
|---|---|---|---|---|---|---|---|
| Sample | Ca 1 − x | Sr 1 − x | La x | Co y | Zn z | Co + Zn y + z | n |
| 66* | 0.55 | — | 0.45 | 0.11 | 0.10 | 0.21 | 5.21 |
| 67* | 0.55 | — | 0.45 | 0.11 | 0.10 | 0.21 | 5.11 |
| 68* | 0.55 | — | 0.45 | 0.11 | 0.10 | 0.21 | 5.11 |
| 69* | 0.55 | — | 0.45 | 0.11 | 0.10 | 0.21 | 5.01 |
| 70* | 0.55 | — | 0.45 | 0.11 | 0.10 | 0.21 | 5.01 |
| 71* | 0.55 | — | 0.45 | 0.11 | 0.10 | 0.21 | 5.01 |
| 72** | — | 0.80 | 0.20 | 0.13 | 0.10 | 0.23 | 5.92 |
| 73** | — | 0.80 | 0.20 | 0.13 | 0.10 | 0.23 | 5.92 |
| 74** | — | 0.80 | 0.20 | 0.13 | 0.10 | 0.23 | 5.92 |
| 75** | — | 0.80 | 0.20 | 0.13 | 0.10 | 0.23 | 5.92 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 66* | 1200 | 0.450 | 0.50 | 0.466 | 0.455 | 39.4 | 236.2 |
| 67* | 1200 | 0.450 | 0.50 | 0.471 | 0.458 | 40.4 | 234.5 |
| 68* | 1200 | 0.475 | 0.50 | 0.470 | 0.456 | 40.0 | 249.3 |
| 69* | 1200 | 0.475 | 0.50 | 0.470 | 0.457 | 40.0 | 223.1 |
| 70* | 1200 | 0.500 | 0.50 | 0.470 | 0.458 | 40.3 | 239.1 |
| 71* | 1200 | 0.525 | 0.50 | 0.470 | 0.458 | 39.2 | 247.8 |
| 72** | 1200 | 0.450 | 0.50 | 0.460 | 0.447 | 28.2 | 229.8 |
| 73** | 1200 | 0.475 | 0.50 | 0.457 | 0.444 | 37.7 | 237.5 |
| 74** | 1200 | 0.500 | 0.50 | 0.457 | 0.445 | 37.7 | 238.9 |
| 75** | 1200 | 0.525 | 0.50 | 0.457 | 0.444 | 37.6 | 247.6 |

*Samples of Reference Examples.
**Samples of Comparative Examples.

As shown in Table 5 and FIG. 5, the sintered ferrite magnets of Samples 66-71 (Reference Examples) had high $B_r$ with little decrease in $H_{cJ}$. Also, the sintered ferrite magnets of Samples 66-71 (Reference Examples) had higher $B_r$ and not lower $H_{cJ}$ than those of conventional sintered Sr—La—Co magnets of Samples 72-75 (Comparative Examples), in which part of Co was substituted by Zn.

Experiment 1

Samples 79-84 and 86-96 of Experiments of the present invention, and Samples 76-78 and 85 (with * in Table 6) of Reference Examples according to the embodiments of Japanese Patent Application No. 2017-102245, were produced in the same manner as in Reference Example 1, except for changing the atomic ratios, the value of n, the calcining temperature, and the amounts of $SiO_2$ and $CaCO_3$ (calculated as CaO) were changed to those shown in Table 6 in each Sample, with the sintering temperature kept at 1170° C. in Samples 76-85, and with the sintering temperature changed to 1190° C. in Samples 86-96. The measured $J_s$, $B_r$, (BH)max and $H_{cJ}$ of the resultant sintered ferrite magnets are shown in Table 6.

TABLE 6

| | Atomic Ratio ($Ca_{1-x}La_xFe_{2n-y-z}Co_yZn_z$) | | | | | |
|---|---|---|---|---|---|---|
| Sample | Ca 1 − x | La x | Co y | Zn z | Co + Zn y + z | n |
| 76* | 0.45 | 0.55 | 0.24 | 0.10 | 0.34 | 5.27 |
| 77* | 0.45 | 0.55 | 0.24 | 0.10 | 0.34 | 5.27 |
| 78* | 0.45 | 0.55 | 0.24 | 0.10 | 0.34 | 5.27 |
| 79 | 0.45 | 0.55 | 0.24 | 0.15 | 0.39 | 5.28 |
| 80 | 0.45 | 0.55 | 0.24 | 0.15 | 0.39 | 5.28 |
| 81 | 0.45 | 0.55 | 0.24 | 0.15 | 0.39 | 5.28 |
| 82 | 0.45 | 0.55 | 0.21 | 0.14 | 0.35 | 5.23 |
| 83 | 0.45 | 0.55 | 0.21 | 0.14 | 0.35 | 5.23 |
| 84 | 0.45 | 0.55 | 0.21 | 0.14 | 0.35 | 5.23 |
| 85* | 0.525 | 0.475 | 0.15 | 0.05 | 0.20 | 5.18 |
| 86 | 0.45 | 0.55 | 0.15 | 0.15 | 0.30 | 5.23 |
| 87 | 0.45 | 0.55 | 0.15 | 0.15 | 0.30 | 5.23 |
| 88 | 0.45 | 0.55 | 0.15 | 0.15 | 0.30 | 5.23 |
| 89 | 0.45 | 0.55 | 0.15 | 0.20 | 0.35 | 5.26 |
| 90 | 0.45 | 0.55 | 0.15 | 0.20 | 0.35 | 5.26 |
| 91 | 0.45 | 0.55 | 0.15 | 0.20 | 0.35 | 5.26 |
| 92 | 0.45 | 0.55 | 0.15 | 0.25 | 0.40 | 5.28 |
| 93 | 0.45 | 0.55 | 0.15 | 0.25 | 0.40 | 5.28 |
| 94 | 0.45 | 0.55 | 0.20 | 0.20 | 0.40 | 5.28 |
| 95 | 0.45 | 0.55 | 0.20 | 0.20 | 0.40 | 5.28 |
| 96 | 0.45 | 0.55 | 0.20 | 0.20 | 0.40 | 5.28 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 76* | 1200 | 0 | 0 | 0.471 | 0.467 | 42.6 | 254.4 |
| 77* | 1200 | 0.100 | 0 | 0.462 | 0.462 | 41.5 | 274.8 |
| 78* | 1200 | 0.200 | 0 | 0.463 | 0.463 | 41.7 | 252.4 |
| 79 | 1200 | 0 | 0 | 0.468 | 0.468 | 41.5 | 198.8 |
| 80 | 1200 | 0.100 | 0 | 0.466 | 0.466 | 41.8 | 234.0 |
| 81 | 1200 | 0.200 | 0 | 0.466 | 0.466 | 42.1 | 255.3 |
| 82 | 1200 | 0 | 0 | 0.474 | 0.467 | 41.7 | 234.5 |
| 83 | 1200 | 0.100 | 0 | 0.470 | 0.462 | 41.6 | 243.3 |
| 84 | 1200 | 0.200 | 0 | 0.474 | 0.462 | 41.4 | 240.3 |
| 85* | 1200 | 0 | 0 | 0.453 | 0.448 | 38.0 | 211.1 |
| 86 | 1250 | 0 | 0 | 0.469 | 0.461 | 39.2 | 177.5 |
| 87 | 1250 | 0.100 | 0 | 0.466 | 0.456 | 39.7 | 189.7 |
| 88 | 1250 | 0.200 | 0 | 0.466 | 0.457 | 39.5 | 171.6 |
| 89 | 1200 | 0.100 | 0 | 0.478 | 0.469 | 40.5 | 177.1 |
| 90 | 1200 | 0.200 | 0 | 0.478 | 0.467 | 41.5 | 183.1 |
| 91 | 1200 | 0.300 | 0 | 0.469 | 0.460 | 39.6 | 166.3 |
| 92 | 1250 | 0.200 | 0 | 0.481 | 0.470 | 36.2 | 165.1 |
| 93 | 1250 | 0.300 | 0 | 0.477 | 0.465 | 38.9 | 174.9 |
| 94 | 1300 | 0.100 | 0 | 0.473 | 0.464 | 38.8 | 193.8 |
| 95 | 1300 | 0.200 | 0 | 0.474 | 0.465 | 40.1 | 205.4 |
| 96 | 1300 | 0.300 | 0 | 0.470 | 0.460 | 39.5 | 216.7 |

*Samples of Reference Examples.

As shown in Table 6, the sintered ferrite magnets of Experiments of the present invention (Samples 79-84 and 86-96) had high $B_r$ with little decrease in $H_{cJ}$.

Experiment 2

Samples 97-128 of Experiments of the present invention were produced in the same manner as in Reference Example 1, except for changing the atomic ratios, the value of n, the calcining temperature, and the amounts of $SiO_2$ and $CaCO_3$ (calculated as CaO) to those shown in Table 7, the average particle size after fine pulverization to 0.65 μm, and the sintering temperature to 1190° C., in each Sample. The measured $J_s$, $B_r$, (BH)max and $H_{cJ}$ of the resultant sintered ferrite magnets are shown in Table 7.

TABLE 7

| | Atomic Ratio ($Ca_{1-x}La_xFe_{2n-y-z}Co_yZn_z$) | | | | |
|---|---|---|---|---|---|
| Sample | Ca 1 − x | La x | Co y | Zn z | Co + Zn y + z | n |

| Sample | Ca 1 − x | La x | Co y | Zn z | Co + Zn y + z | n |
|---|---|---|---|---|---|---|
| 97 | 0.4 | 0.6 | 0.15 | 0.25 | 0.4 | 5.59 |
| 98 | 0.4 | 0.6 | 0.15 | 0.3 | 0.45 | 5.61 |
| 99 | 0.4 | 0.6 | 0.15 | 0.25 | 0.4 | 5.59 |
| 100 | 0.4 | 0.6 | 0.15 | 0.3 | 0.45 | 5.61 |
| 101 | 0.4 | 0.6 | 0.15 | 0.35 | 0.5 | 5.64 |
| 102 | 0.35 | 0.65 | 0.15 | 0.25 | 0.4 | 5.59 |
| 103 | 0.35 | 0.65 | 0.15 | 0.3 | 0.45 | 5.61 |
| 104 | 0.35 | 0.65 | 0.15 | 0.3 | 0.45 | 5.61 |
| 105 | 0.4 | 0.6 | 0.2 | 0.2 | 0.4 | 5.59 |
| 106 | 0.4 | 0.6 | 0.2 | 0.2 | 0.4 | 5.59 |
| 107 | 0.4 | 0.6 | 0.2 | 0.25 | 0.45 | 5.61 |
| 108 | 0.4 | 0.6 | 0.2 | 0.25 | 0.45 | 5.61 |
| 109 | 0.4 | 0.6 | 0.2 | 0.25 | 0.45 | 5.61 |
| 110 | 0.4 | 0.6 | 0.2 | 0.25 | 0.45 | 5.61 |
| 111 | 0.35 | 0.65 | 0.2 | 0.25 | 0.45 | 5.61 |
| 112 | 0.35 | 0.65 | 0.2 | 0.3 | 0.5 | 5.64 |
| 113 | 0.35 | 0.65 | 0.2 | 0.25 | 0.45 | 5.61 |
| 114 | 0.35 | 0.65 | 0.2 | 0.3 | 0.5 | 5.64 |
| 115 | 0.3 | 0.7 | 0.2 | 0.25 | 0.45 | 5.61 |
| 116 | 0.3 | 0.7 | 0.2 | 0.3 | 0.5 | 5.64 |
| 117 | 0.3 | 0.7 | 0.2 | 0.3 | 0.5 | 5.64 |
| 118 | 0.3 | 0.7 | 0.2 | 0.35 | 0.55 | 5.66 |
| 119 | 0.4 | 0.6 | 0.25 | 0.15 | 0.4 | 5.59 |
| 120 | 0.4 | 0.6 | 0.25 | 0.2 | 0.45 | 5.61 |
| 121 | 0.4 | 0.6 | 0.25 | 0.15 | 0.4 | 5.59 |
| 122 | 0.4 | 0.6 | 0.25 | 0.2 | 0.45 | 5.61 |
| 123 | 0.35 | 0.65 | 0.25 | 0.15 | 0.4 | 5.59 |
| 124 | 0.35 | 0.65 | 0.25 | 0.2 | 0.45 | 5.61 |
| 125 | 0.35 | 0.65 | 0.25 | 0.25 | 0.5 | 5.64 |
| 126 | 0.35 | 0.65 | 0.25 | 0.15 | 0.4 | 5.59 |
| 127 | 0.35 | 0.65 | 0.25 | 0.2 | 0.45 | 5.61 |
| 128 | 0.35 | 0.65 | 0.25 | 0.25 | 0.5 | 5.64 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 97 | 1300 | 0.05 | 0.1 | 0.484 | 0.475 | 39.5 | 170.9 |
| 98 | 1300 | 0.1 | 0.1 | 0.486 | 0.473 | 39.1 | 168.4 |
| 99 | 1300 | 0.25 | 0.3 | 0.476 | 0.464 | 41.1 | 195.6 |
| 100 | 1300 | 0.3 | 0.3 | 0.476 | 0.463 | 38.5 | 177.5 |
| 101 | 1300 | 0.35 | 0.3 | 0.481 | 0.461 | 36.0 | 162.7 |
| 102 | 1300 | 0.05 | 0.1 | 0.477 | 0.467 | 33.2 | 161.8 |
| 103 | 1300 | 0 | 0.1 | 0.478 | 0.476 | 34.7 | 157.5 |
| 104 | 1300 | 0.3 | 0.3 | 0.475 | 0.467 | 38.3 | 151.3 |
| 105 | 1300 | 0 | 0.1 | 0.482 | 0.473 | 40.4 | 195.7 |
| 106 | 1300 | 0.25 | 0.3 | 0.477 | 0.465 | 41.5 | 223.9 |
| 107 | 1300 | 0 | 0.1 | 0.485 | 0.474 | 38.1 | 165.8 |
| 108 | 1300 | 0.1 | 0.1 | 0.483 | 0.469 | 40.0 | 184.3 |
| 109 | 1300 | 0.25 | 0.3 | 0.481 | 0.467 | 39.5 | 177.6 |
| 110 | 1300 | 0.3 | 0.3 | 0.480 | 0.464 | 39.1 | 195.6 |
| 111 | 1300 | 0 | 0.1 | 0.476 | 0.474 | 35.5 | 187.1 |
| 112 | 1300 | 0.05 | 0.1 | 0.475 | 0.471 | 38.8 | 169.5 |
| 113 | 1300 | 0.05 | 0.3 | 0.472 | 0.468 | 39.1 | 187.4 |
| 114 | 1300 | 0.05 | 0.3 | 0.471 | 0.466 | 37.0 | 164.4 |
| 115 | 1300 | 0.05 | 0.3 | 0.472 | 0.470 | 37.2 | 186.0 |
| 116 | 1300 | 0 | 0.1 | 0.477 | 0.474 | 34.2 | 162.0 |
| 117 | 1300 | 0.05 | 0.3 | 0.473 | 0.469 | 34.8 | 165.4 |
| 118 | 1300 | 0.05 | 0.3 | 0.472 | 0.466 | 33.2 | 154.5 |
| 119 | 1300 | 0 | 0.1 | 0.480 | 0.470 | 42.8 | 255.9 |
| 120 | 1300 | 0 | 0.1 | 0.482 | 0.472 | 40.7 | 202.9 |
| 121 | 1300 | 0.25 | 0.3 | 0.474 | 0.463 | 41.3 | 267.8 |
| 122 | 1300 | 0.3 | 0.3 | 0.474 | 0.461 | 39.2 | 233.1 |
| 123 | 1300 | 0 | 0.1 | 0.470 | 0.460 | 40.7 | 244.7 |
| 124 | 1300 | 0 | 0.1 | 0.483 | 0.475 | 41.8 | 224.5 |
| 125 | 1300 | 0 | 0.1 | 0.486 | 0.474 | 39.9 | 191.1 |
| 126 | 1300 | 0.05 | 0.3 | 0.477 | 0.467 | 42.3 | 246.7 |
| 127 | 1300 | 0.05 | 0.3 | 0.478 | 0.468 | 41.7 | 223.9 |
| 128 | 1300 | 0.05 | 0.3 | 0.482 | 0.466 | 38.7 | 188.4 |

As shown in Table 7, the sintered ferrite magnets of Experiments of the present invention (Samples 97-128) had high $B_r$ with little decrease in $H_{cJ}$, exhibiting not lower magnetic properties than those of Reference Examples according to the embodiments of Japanese Patent Application No. 2017-102245.

Experiment 3

Samples 129-148 of Experiments of the present invention were produced in the same manner as in Reference Example 1, except for changing the atomic ratios, the value of n, the calcining temperature, and the amounts of $SiO_2$ and $CaCO_3$ (calculated as CaO) to those shown in Table 8, the average particle size after fine pulverization to 0.55 μm, and the sintering temperature to 1190° C., in each Sample. The measured $J_s$, $B_r$, $(BH)max$ and $H_{cJ}$ of the resultant sintered ferrite magnets are shown in Table 8.

TABLE 8

| | Atomic Ratio ($Ca_{1-x}La_xFe_{2n-y-z}Co_yZn_z$) | | | | |
|---|---|---|---|---|---|
| Sample | Ca 1 − x | La x | Co y | Zn z | Co + Zn y + z | n |
| 129 | 0.35 | 0.65 | 0.3 | 0.15 | 0.45 | 5.61 |
| 130 | 0.35 | 0.65 | 0.3 | 0.15 | 0.45 | 5.61 |
| 131 | 0.35 | 0.65 | 0.3 | 0.15 | 0.45 | 5.61 |
| 132 | 0.35 | 0.65 | 0.3 | 0.2 | 0.5 | 5.64 |
| 133 | 0.35 | 0.65 | 0.3 | 0.2 | 0.5 | 5.64 |
| 134 | 0.35 | 0.65 | 0.3 | 0.2 | 0.5 | 5.64 |
| 135 | 0.3 | 0.7 | 0.3 | 0.2 | 0.5 | 5.64 |
| 136 | 0.3 | 0.7 | 0.3 | 0.2 | 0.5 | 5.64 |
| 137 | 0.3 | 0.7 | 0.3 | 0.25 | 0.55 | 5.66 |
| 138 | 0.3 | 0.7 | 0.3 | 0.25 | 0.55 | 5.66 |
| 139 | 0.35 | 0.65 | 0.35 | 0.15 | 0.5 | 5.64 |
| 140 | 0.35 | 0.65 | 0.35 | 0.15 | 0.5 | 5.64 |
| 141 | 0.35 | 0.65 | 0.35 | 0.2 | 0.55 | 5.66 |
| 142 | 0.35 | 0.65 | 0.35 | 0.2 | 0.55 | 5.66 |
| 143 | 0.3 | 0.7 | 0.35 | 0.15 | 0.5 | 5.64 |
| 144 | 0.3 | 0.7 | 0.35 | 0.15 | 0.5 | 5.64 |
| 145 | 0.3 | 0.7 | 0.35 | 0.2 | 0.55 | 5.66 |
| 146 | 0.3 | 0.7 | 0.35 | 0.2 | 0.55 | 5.66 |
| 147 | 0.3 | 0.7 | 0.35 | 0.25 | 0.6 | 5.69 |
| 148 | 0.3 | 0.7 | 0.35 | 0.25 | 0.6 | 5.69 |

| Sample | Calcining Temperature [° C.] | $SiO_2$ [% by mass] | $CaCO_3$ [% by mass] | $J_s$ [T] | $B_r$ [T] | $(BH)_{max}$ [kJ/m³] | $H_{cJ}$ [kA/m] |
|---|---|---|---|---|---|---|---|
| 129 | 1300 | 0 | 0.1 | 0.472 | 0.463 | 41.2 | 272.7 |
| 130 | 1300 | 0 | 0.3 | 0.475 | 0.468 | 41.8 | 324.4 |
| 131 | 1300 | 0.4 | 0.5 | 0.471 | 0.460 | 40.4 | 275.4 |
| 132 | 1300 | 0 | 0.1 | 0.484 | 0.476 | 42.6 | 257.9 |
| 133 | 1300 | 0.05 | 0.3 | 0.481 | 0.470 | 41.3 | 244.9 |
| 134 | 1300 | 0.45 | 0.5 | 0.475 | 0.463 | 39.9 | 234.8 |
| 135 | 1300 | 0.1 | 0.1 | 0.475 | 0.466 | 37.3 | 235.2 |
| 136 | 1300 | 0.05 | 0.3 | 0.481 | 0.471 | 41.8 | 257.2 |
| 137 | 1300 | 0 | 0.1 | 0.489 | 0.478 | 37.5 | 205.0 |
| 138 | 1300 | 0.05 | 0.3 | 0.483 | 0.471 | 38.6 | 221.8 |
| 139 | 1300 | 0 | 0.1 | 0.483 | 0.474 | 43.0 | 288.9 |
| 140 | 1300 | 0.05 | 0.3 | 0.479 | 0.468 | 41.5 | 287.0 |
| 141 | 1300 | 0 | 0.1 | 0.483 | 0.472 | 41.0 | 253.3 |
| 142 | 1300 | 0 | 0.3 | 0.482 | 0.467 | 39.6 | 243.4 |
| 143 | 1300 | 0.05 | 0.1 | 0.477 | 0.464 | 40.4 | 288.0 |
| 144 | 1300 | 0 | 0.3 | 0.480 | 0.469 | 41.8 | 294.4 |
| 145 | 1300 | 0 | 0.1 | 0.485 | 0.475 | 40.6 | 254.7 |
| 146 | 1300 | 0.05 | 0.3 | 0.483 | 0.468 | 40.5 | 252.2 |
| 147 | 1300 | 0 | 0.1 | 0.486 | 0.472 | 38.6 | 216.0 |
| 148 | 1300 | 0.05 | 0.3 | 0.482 | 0.467 | 37.8 | 219.9 |

As shown in Table 8, the sintered ferrite magnets (Samples 129-148) of Experiments of the present invention had high $B_r$ with little decrease in $H_{cJ}$, exhibiting not lower magnetic properties than those of Reference Examples according to the embodiment of Japanese Patent Application No. 2017-102245.

Experiment 4

As Comparative Examples to be compared with Experiments of the present invention, $SrCO_3$ powder, $La(OH)_3$ powder, $Fe_2O_3$ powder, $Co_3O_4$ powder and ZnO powder were formulated and mixed, such that the atomic ratios of Sr, La, Co and Zn and n in the general formula of $Sr_{1-x}La_xFe_{2n-y-z}Co_yZn_z$ were those shown in Samples 149-154 in Table 9-1, to obtain starting material powder mixtures. 0.1% by mass of $H_3BO_3$ powder was added to and mixed with 100% by mass of each starting material powder mixture.

Also, as Comparative Examples to be compared with Experiments of the present invention, $CaCO_3$ powder, $La(OH)_3$ powder, $SrCO_3$ powder, $Fe_2O_3$ powder, $Co_3O_4$ powder and ZnO powder were formulated and mixed, such that the atomic ratios of Ca La, Sr, Co and Zn and n in the general formula of $Ca_{1-x-x'}La_xSr_{x'}Fe_{2n-y-z}Co_yZn_z$ were those shown in Sample 155 in Table 9-2, to obtain a starting material powder mixture. 0.1% by mass of $H_3BO_3$ powder was added to and mixed with 100% by mass of the starting material powder mixture.

Each of the resultant two types of starting material powder mixtures was mixed for 4 hours in a wet ball mill, and dried for granulation. They were then calcined at temperatures shown in Tables 9-1 and 9-2 for 3 hours in the air, to obtain two types of calcined bodies. Each calcined body was coarsely pulverized by a hammer mill to obtain two types of coarsely pulverized calcined powders. $SiO_2$ and $CaCO_3$ (calculated as CaO) shown in Tables 9-1 and 9-2 were added to 100% by mass of each coarsely pulverized calcined powder, and finely pulverized to an average particle size of 0.65 μm [measured by an air permeability method using an apparatus for measuring a specific surface area of powder (SS-100 available from Shimadzu Corporation)] in a wet ball mill containing water as a dispersion medium, to obtain 7 types of finely pulverized slurries. Each finely pulverized slurry obtained by the pulverization step was molded under pressure of about 50 MPa while removing the dispersion medium, in a magnetic field of about 1 T using a parallel-magnetic-field molding machine (vertical-magnetic-field molding machine), in which the direction of a magnetic field was in parallel with the compression direction, to obtain 7 types of green bodies. Each green body was sintered at 1190° C. for 1 hour in the air, to produce 7 types of Samples 149-155 (with ** in Tables 9-1 and 9-2) of Comparative Examples. The measured $J_s$, $B_r$, (BH)max and $H_{cJ}$ of the resultant sintered ferrite magnets are shown in Tables 9-1 and 9-2. Samples 149-154 were conventional sintered Sr—La—Co magnets of Comparative Examples, in which part of Co was substituted by Zn, and Sample 155 was Comparative Example differing from the present invention in containing Sr.

TABLE 9-1

| | Atomic Ratio ($Sr_{1-x}La_xFe_{2n-y-z}Co_yZn_z$) | | | | |
|---|---|---|---|---|---|
| Sample | Sr 1 − x | La x | Co y | Zn z | Co + Zn y + z | n |
| 149** | 0.75 | 0.25 | 0.16 | 0.25 | 0.41 | 5.91 |
| 150** | 0.75 | 0.25 | 0.16 | 0.25 | 0.41 | 5.91 |
| 151** | 0.75 | 0.25 | 0.16 | 0.25 | 0.41 | 5.91 |
| 152** | 0.75 | u.25 | 0.16 | 0.25 | 0.41 | 5.91 |
| 153** | 0.75 | 0.25 | 0.16 | 0.25 | 0.41 | 5.91 |
| 154** | 0.75 | 0.25 | 0.16 | 0.25 | 0.41 | 5.91 |

| Sample | Calcining Temperature [° C.] | $SiO_2$ [% by mass] | $CaCO_3$ [% by mass] | $J_s$ [T] | $B_r$ [T] | (BH)$_{max}$ [kJ/m³] | $H_{cJ}$ [kA/m] |
|---|---|---|---|---|---|---|---|
| 149** | 1250 | 0.05 | 0.10 | 0.462 | 0.449 | 33.0 | 185.9 |
| 150** | 1250 | 0.10 | 0.10 | 0.461 | 0.447 | 33.6 | 187.8 |
| 151** | 1250 | 0.15 | 0.10 | 0.460 | 0.446 | 33.7 | 184.5 |
| 152** | 1250 | 0.25 | 0.30 | 0.463 | 0.447 | 33.9 | 167.2 |
| 153** | 1250 | 0.30 | 0.30 | 0.463 | 0.448 | 34.1 | 169.9 |
| 154** | 1250 | 0.35 | 0.30 | 0.462 | 0.447 | 34.2 | 183.7 |

**Samples of Comparative Examples.

TABLE 9-2

| | Atomic Ratio ($Ca_{1-x-x'}La_xSr_{x'}Fe_{2n-y-z}Co_yZn_z$) | | | | | | |
|---|---|---|---|---|---|---|---|
| Sample | Ca 1 − x − x' | Sr x' | La x | Co y | Zn z | Co + Zn y + z | n |
| 155** | 0.474 | 0.064 | 0.462 | 0.196 | 0.119 | 0.315 | 4.83 |

| Sample | Calcining Temperature [° C.] | $SiO_2$ [% by mass] | $CaCO_3$ [% by mass] | $J_s$ [T] | $B_r$ [T] | (BH)$_{max}$ [kJ/m³] | $H_{cJ}$ [kA/m] |
|---|---|---|---|---|---|---|---|
| 155** | 1250 | 0.45 | 0.95 | 0.450 | 0.435 | 31.3 | 147.9 |

**Sample of Comparative Example.

As shown in Table 9-1, the conventional sintered Sr—La—Co magnets of Comparative Examples (Samples 149-154), in which part of Co was substituted by Zn, had extremely lower $B_r$ than those of Experiments of the present invention (Samples 97-104) having substantially the same Co content. Also, as shown in Table 9-2, Comparative Example (Sample 155) different from the present invention in containing Sr had extremely lower magnetic properties than those of Experiments of the present invention.

Experiment 5

Samples 156-160 of Experiments of the present invention were produced in the same manner as in Reference Example 1, except for changing the atomic ratios, the value of n, the calcining temperature, and the amounts of $SiO_2$ and $CaCO_3$ (calculated as CaO) to those shown in Table 10, the average particle size after fine pulverization to 0.55 μm, and the sintering temperature to 1210° C., in each Sample. The measured $J_s$, $B_r$, (BH)max, $H_{cJ}$ of the resultant sintered ferrite magnets are shown in Table 10.

TABLE 10

| | Atomic Ratio ($Ca_{1-x}La_xFe_{2n-y-z}Co_yZn_z$) | | | | |
|---|---|---|---|---|---|
| Sample | Ca 1 − x | La x | Co y | Zn z | Co + Zn y + z | n |
| 156 | 0.35 | 0.65 | 0.3 | 0.2 | 0.5 | 5.64 |
| 157 | 0.35 | 0.65 | 0.3 | 0.2 | 0.5 | 5.64 |
| 158 | 0.35 | 0.65 | 0.3 | 0.2 | 0.5 | 5.64 |
| 159 | 0.3 | 0.7 | 0.3 | 0.25 | 0.55 | 5.66 |
| 160 | 0.3 | 0.7 | 0.3 | 0.25 | 0.55 | 5.66 |

| Sample | Calcining Temperature [° C.] | $SiO_2$ [% by mass] | $CaCO_3$ [% by mass] | $J_s$ [T] | $B_r$ [T] | (BH)$_{max}$ [kJ/m³] | $H_{cJ}$ [kA/m] |
|---|---|---|---|---|---|---|---|
| 156 | 1300 | 0 | 0.1 | 0.486 | 0.480 | 42.5 | 236.1 |
| 157 | 1300 | 0 | 0.3 | 0.482 | 0.474 | 39.1 | 211.1 |
| 158 | 1300 | 0.4 | 0.5 | 0.477 | 0.465 | 40.2 | 241.9 |
| 159 | 1300 | 0 | 0.1 | 0.488 | 0.479 | 34.0 | 174.2 |
| 160 | 1300 | 0 | 0.3 | 0.484 | 0.474 | 38.3 | 200.2 |

As shown in Table 10, the sintered ferrite magnets of Experiments of the present invention exhibited as high $B_r$ as 0.480 T at maximum.

APPLICABILITY IN INDUSTRY

The present invention can provide sintered ferrite magnets having high $B_r$ with little decrease in $H_{cJ}$, which can be used suitably for motors for home electric appliances, etc.

What is claimed is:

1. A sintered ferrite magnet represented by the general formula of $Ca_{1-x}La_xFe_{2n-y-z}Co_yZn_z$ expressing the atomic ratios of metal elements of Ca, La, Fe, Co and Zn, wherein x, y, z, and n [2n is a molar ratio represented by $2n=(Fe+Co+Zn)/(Ca+La)$] meet $0.4<x<0.75$,
$0.15 \le y \le 0.20$,
$0.25 \le z <0.4$,
$0.40 \le (y+z) <0.6$, and
$3 \le n \le 6$,
wherein 0-0.45% by mass of Si calculated as $SiO_2$ is contained, and
wherein the sintered ferrite magnet has a remanence $B_r$ of 0.465 T or higher.

2. The sintered ferrite magnet according to claim 1, wherein said y and z meet $0.15 \le y \le 0.20$, and $0.25 \le z \le 0.35$.

3. The sintered ferrite magnet according to claim 1, wherein said x meets $0.475 \le x \le 0.7$.

4. The sintered ferrite magnet according to claim 1, wherein said y and z meet $0.40 \le (y+z) \le 0.55$.

5. The sintered ferrite magnet according to claim 1, wherein said x meets $0.55 \le x \le 0.7$.

6. The sintered ferrite magnet according to claim 1, wherein said x meets $0.6 \le x \le 0.7$.

7. The sintered ferrite magnet according to claim 1, wherein said y and z meet $0.40 \le (y+z) \le 0.5$.

8. The sintered ferrite magnet according to claim 1, wherein said y and z meet $0.40 \le (y+z) \le 0.45$.

9. A sintered ferrite magnet represented by the general formula of $Ca_{1-x}La_xFe_{2n-y-z}Co_yZn_z$ expressing the atomic ratios of metal elements of Ca, La, Fe, Co and Zn, wherein x, y, z, and n [2n is a molar ratio represented by $2n=(Fe+Co+Zn)/(Ca+La)$] meet $0.4<x<0.75$,
$0.15 \le y \le 0.20$,
$0.25 \le z <0.4$,
$0.40 \le (y+z) <0.6$, and
$3 \le n \le 6$,
wherein part of La is substituted by at least one of rare earth elements excluding La in the above general formula,
wherein 0-0.45% by mass of Si calculated as $SiO_2$ is contained, and
wherein the sintered ferrite magnet has a remanence $B_r$ of 0.465 T or higher.

10. The sintered ferrite magnet according to claim 9, wherein 50% or less by mol of La is substituted by at least one of rare earth elements excluding La in the above general formula.

11. The sintered ferrite magnet according to claim 9, wherein said y and z meet $0.15 \le y \le 0.20$, and $0.25 \le z \le 0.35$.

12. The sintered ferrite magnet according to claim 9, wherein said x meets $0.475 \le x \le 0.7$.

13. The sintered ferrite magnet according to claim 9, wherein said x meets $0.55 \le x \le 0.7$.

14. The sintered ferrite magnet according to claim 9, wherein said x meets $0.6 \le x \le 0.7$.

15. The sintered ferrite magnet according to claim 9, wherein said y and z meet $0.40 \le (y+z) \le 0.55$.

16. The sintered ferrite magnet according to claim 9, wherein said y and z meet $0.40 \le (y+z) \le 0.5$.

17. The sintered ferrite magnet according to claim 9, wherein said y and z meet $0.40 \le (y+z) \le 0.45$.

18. A sintered ferrite magnet represented by the general formula of $Ca_{1-x}La_xFe_{2n-y-z}Co_yZn_z$ expressing the atomic ratios of metal elements of Ca, La, Fe, Co and Zn, wherein x, y, z, and n [2n is a molar ratio represented by $2n=(Fe+Co+Zn)/(Ca+La)$] meet $0.4<x<0.75$,
$0.15 \le y \le 0.18$,
$0.20 \le z <0.4$,
$0.35 \le (y+z) <0.58$, and
$3 \le n \le 6$,
wherein 0-0.45% by mass of Si calculated as $SiO_2$ is contained, and
wherein the sintered ferrite magnet has a remanence Br of 0.465 T or higher.

19. A sintered ferrite magnet represented by the general formula of $Ca_{1-x}La_xFe_{2n-y-z}Co_yZn_z$ expressing the atomic ratios of metal elements of Ca, La, Fe, Co and Zn, wherein x, y, z, and n [2n is a molar ratio represented by $2n=(Fe+Co+Zn)/(Ca+La)$] meet $0.4<x<0.75$,
$0.15 \le y \le 0.18$,
$0.20 \le z <0.4$,
$0.35 \le (y+z) <0.58$, and
$3 \le n \le 6$,
wherein part of La is substituted by at least one of rare earth elements excluding La in the above general formula,
wherein 0-0.45% by mass of Si calculated as $SiO_2$ is contained, and
wherein the sintered ferrite magnet has a remanence Br of 0.465 T or higher.

* * * * *